United States Patent [19]

Sutter

[11] Patent Number: 4,461,270

[45] Date of Patent: Jul. 24, 1984

[54] CHARCOAL STARTER-BURNER

[76] Inventor: Richard A. Sutter, 7215 Greenway, University City, Mo. 63130

[21] Appl. No.: 360,620

[22] Filed: Mar. 22, 1982

Related U.S. Application Data

[63] Continuation-in-part of Ser. No. 100,517, Dec. 5, 1979, Pat. No. 4,321,907.

[51] Int. Cl.³ .............................................. F24B 3/00
[52] U.S. Cl. ................................. 126/25 B; 126/59.5; 126/162
[58] Field of Search ................. 126/25 R, 25 A, 25 B, 126/59.5, 162, 171, 177, 158

[56] References Cited

U.S. PATENT DOCUMENTS

| | | | |
|---|---|---|---|
| 1,096,105 | 5/1914 | Gong | 126/162 |
| 1,298,762 | 4/1919 | Milligan | 126/59.5 |
| 2,488,014 | 11/1949 | Higman | 126/59 |
| 3,116,704 | 1/1964 | Byars, Sr. et al. | 126/25 B |
| 3,330,232 | 7/1967 | Wagle | 126/162 |
| 4,282,854 | 7/1981 | Byars | 126/25 B |

Primary Examiner—Lee E. Barrett
Attorney, Agent, or Firm—Polster, Polster and Lucchesi

[57] ABSTRACT

A charcoal starter-burner of the general type exemplified by U.S. Pat. No. 4,321,907 has a perforate grate hinged at one side and spaced inwardly from the inner wall of a tubular housing. The hinge axis defines a side of the grate of greater extent and a side of lesser extent, the grate being substantially planar on the side of greater extent and being bent down from that plane to define a lip on the side of lesser extent, the lip being at an angle of between 30° and 50° from the upper surface of the planar side of greater extent of the grate. The tubular housing is provided with a stop projecting into the housing above the grate at a side opposite the hinge axis and with two holes located chordally with respect to one another, symmetrically with respect to the stop and immediately below the grate. A retainer for the grate in its horizontal position is provided, the retainer having a straight reach extending between and through the holes, a handle reach tending away from the straight reach, and a detent reach tending toward the straight reach sufficiently close to the straight reach to engage the outside surface of the housing when the retainer is in place, the retainer being sufficiently flexible to allow the detent reach to be sprung away from the housing to permit selective withdrawal of the straight reach from the holes.

5 Claims, 15 Drawing Figures

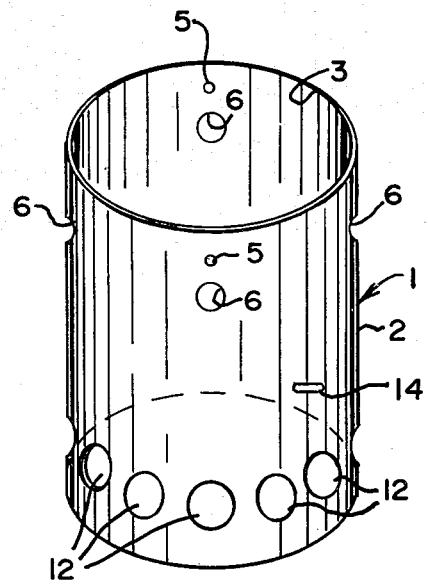
FIG. 1.
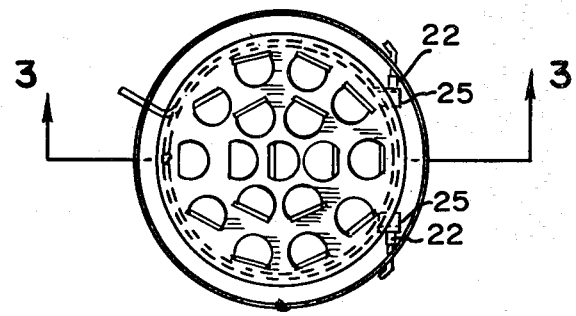
FIG. 2.
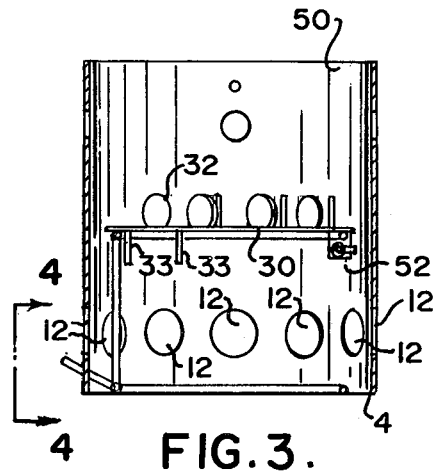
FIG. 3.
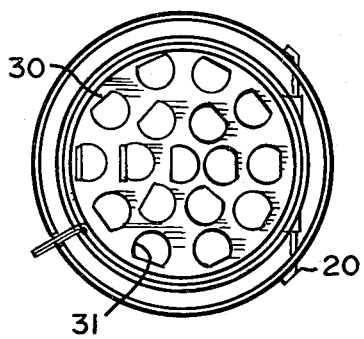
FIG. 4.
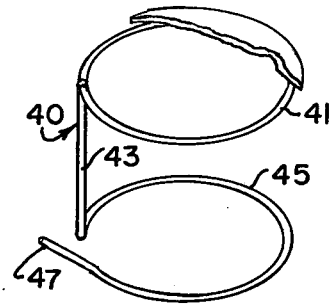
FIG. 5.
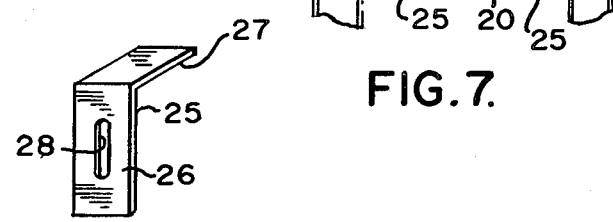
FIG. 6.
FIG. 7.
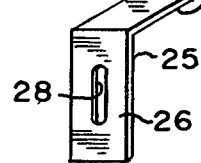
FIG. 8.

CHARCOAL STARTER-BURNER

RELATED APPLICATION

This is a continuation-in-part of my application Ser. No. 100,517, filed Dec. 5, 1979, now U.S. Pat. No. 4,321,907.

BACKGROUND OF THE INVENTION

Charcoal starters, by which charcoal used in outdoor grills and the like can be ignited by using newspaper or the like instead of flammable liquid starters, which are somewhat dangerous and expensive and may impart an undesirable flavor to foods, are well known, as exemplified by U.S. patents to Byers et al, U.S. Pat. Nos. 3,167,040 and 3,116,704. The present invention is an improvement over the prior art devices. In one embodiment, it provides for positive retention of paper in the housing and of the charcoal grate when the starter is set on a base, and permits easy dumping while ensuring that the ignited charcoal is not dumped until the starter is lifted from the base upon which it has been set. Means are provided for inhibiting occlusion of openings in the grate by either paper or charcoal. Another improvement, which is described in connection with a second embodiment but is applicable to either, lies in the provision of a lip on the charcoal grate, to inhibit jamming of charcoal when the grate is dumped.

SUMMARY OF THE INVENTION

In accordance with this invention, generally stated, a charcoal starter-burner is provided, with a tall open-ended tubular housing, and a perforate grate hinged at one side, defining an upper, charcoal receiving chamber and a lower, paper receiving chamber. The grate is spaced inwardly from the inner wall of the housing. In one embodiment, a leg is connected to support the grate in charcoal-retaining position. A foot, connected to the lower end of the leg has a trigger part projecting beyond the periphery of the tubular housing, which, in the preferred embodiment, is received within and biased into latching position within an inverted J-slot the stem of which extends through the bottom edge of the housing. The foot is adjacent the lower edge of the housing, so that when the starter is resting on a grate, or an imperforate base, such as the ground, the grate can not swing down. The foot is so constructed as to serve as a paper-retaining device. The grate hinge, leg and foot are so constructed and arranged as to permit the foot to swing clear of the bottom edge of the tubular housing when the trigger is released and the starter is lifted from the base.

In another embodiment, a lip is provided on the charcoal grate to inhibit jamming of charcoal when the grate is dumped. No leg is provided, and a stop is lanced from the housing wall, to limit the upward movement of the charcoal grate, and a separate retainer, formed to resist accidental dislodgment, is selectively mountable and demountable in the housing to retain the grate in charcoal-supporting position or to allow it to dump by gravity as the case may be.

In the preferred embodiments, tabs adjacent certain of the perforations in the grate inhibit occlusion of the perforations.

BRIEF DESCRIPTION OF THE DRAWINGS

In the drawing,

FIG. 1 is a view in perspective of one embodiment of charcoal starter-burner of this invention;

FIG. 2 is a top plan view;

FIG. 3 is a sectional view taken along the line 3—3 of FIG. 2;

FIG. 4 is a fragmentary detail view in the direction shown at 4—4 in FIG. 3;

FIG. 5 is a bottom plan view;

FIG. 6 is a view in perspective, partly broken away, of the trigger, foot, leg, grate support and grate;

FIG. 7 is a fragmentary view showing the grate hinge arrangement of this embodiment;

FIG. 8 is a detail, somewhat enlarged, of a hinge strap;

DESCRIPTION OF THE PREFERRED EMBODIMENTS

Figure 9:
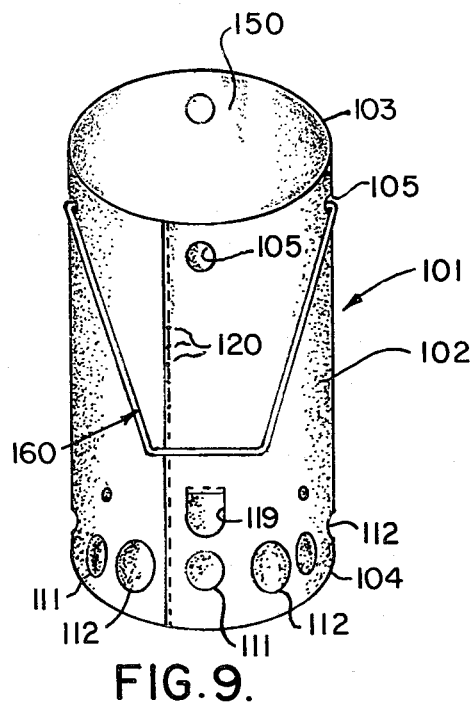
FIG. 9 is a view in perspective of another embodiment of device of this invention.

Referring now to FIGS. 1-8 of the drawing for one illustrative embodiment of charcoal starter-burner of this invention, reference numeral 1 indicates the assembled starter-burner device. The burner 1 includes a tubular housing 2, which, in this embodiment, is cylindrical. The housing 2 has an open top defined by an upper edge 3, and an open bottom defined by a lower edge 4. Below the upper edge, the wall of the housing 2 has two, diametrically opposed, bail-receiving openings 5, below which are larger vent openings 6, shown as being four in number and arranged symmetrically. Above the lower edge 4 are twelve draft holes 12, symmetrically arranged with their centers in a plane perpendicular to the long axis of the cylindrical housing 2.

Axially between the vent holes 6 and the draft holes 12, aligned chordally, are hingepin or rod holes 14.

In this embodiment, an inverted J-slot 16, a stem 17 of which extends through the lower edge 4 of the housing, has a crook portion 18.

A hinge rod 20 extends through the holes 14, and is prevented from coming out either by bending the ends, as shown in FIGS. 1, 2 and 5, or by any other suitable way as by the use of Tinnerman clips or other common fasteners. Spacing sleeves 22 are mounted on the rod outboard of a pair of hinge straps 25. In this embodiment, the hinge straps 25 are L-shaped, with a depending leg portion 26 and a transverse fastening section 27. The section 27 is welded or otherwise secured to the underside of a grate 30, which in this embodiment is a flat, perforate plate. The depending leg 26 of each hinge strap 25 has an elongated, somewhat eliptical hole 28 in it, through which the rod 20 extends.

The grate 30 has openings 31 through it. In the embodiment shown, tabs 32 are lanced from the plate forming the grate to project upwardly at the edge of some of the holes 31, while other tabs 33 are lanced downwardly to form others of the holes 31.

A support assembly 40 is, in this embodiment, made of a single metal rod bent to form a support ring 41, a support leg 43, a foot 45, and a trigger 47. The support ring 41 is shaped complementarily to the grate 30, but is smaller, and is welded or otherwise secured to the underside of the grate. The leg 43 is, as shown in FIG. 3, opposite the rod 20 on a line perpendicular to the rod, so as to support the edge of the grate remote from the hinge axis.

The foot 45, at the lower end of the leg 43, is formed into an incomplete circle, and, at its free end, has a trigger 47 projecting substantially radially, but at an angle from the horizontal, as shown particularly in FIGS. 3 and 6. The foot 45 is sufficiently flexible to bias the trigger 47 in a direction toward the leg 43, but to permit the trigger 47 to be displaced manually in a direction away from the leg 43.

The trigger 47 in the condition shown in FIG. 3, slides in the J-slot 16, and is biased to the position shown in FIG. 4, within the crook 18.

As can be seen from FIG. 3, the grate 30 divides the housing into an upper charcoal chamber 50 and a lower, ignition chamber 52. The grate 30 extends near but at a substantial distance from the inner wall of the housing. The clearance between the grate and the wall is close enough to preclude the charcoal's falling through the space, but far enough to permit the grate to swing downwardly about the rod 20. The foot 45 is preferably spaced farther from the inner wall of the housing than the grate is, but close enough to leave a substantial opening through which crumpled newspaper can be inserted. The foot 45 serves to retain the newspaper, which tends to expand to fill the chamber.

Merely by way of example, and not by way of limitation, the housing of this embodiment can be 12" tall and 8" in diameter. The upper holes 6 can be $\frac{3}{4}$" in diameter, and the lower holes 12, 1$\frac{1}{2}$" in diameter. The grate 30 can be circular, 7$\frac{1}{2}$" in diameter, with a thickness of 1/16". The space between the inner wall and the grate can therefore be $\frac{1}{4}$". The grate is so positioned as to make the upper chamber 50 approximately 7$\frac{1}{2}$" deep, and the lower chamber approximately 4$\frac{1}{2}$" high. The pivot rod can be of 3/16" stock, as can the support assembly 40. The supporting ring 41 can be 6$\frac{1}{8}$" in diameter, the leg 4$\frac{1}{2}$" long, and the foot 6" in diameter.

The holes in the grate can be 1" in diameter in the unobstructed direction, and the tabs 32 and 33 project approximately $\frac{3}{4}$". The J-slot 16 can be $\frac{1}{4}$" wide with the stem 1" high and the crook approximately $\frac{1}{2}$" long. The trigger extends 1" beyond the outside surface of the housing. The eliptical hole in the hinge strap can be on the order of $\frac{5}{8}$" long, providing $\frac{3}{8}$" to 7/16" travel for the grate with respect to the hinge rod.

The assembly of the device is self-evident. In operation, the trigger 47 is moved laterally in a direction away from the leg 43 to permit its entry into the slot 17, and then released at the top of the slot to permit the bias of the foot 45 to move the trigger into the crook 18. Crumpled newspaper, of which two full sheets have been found to be sufficient, are shoved through the opening in the foot 45 into the ignition chamber 52. Charcoal briquettes are put into the upper chamber, where they rest on tabs 32. The charcoal need not be in briquette form. A suitable handle, which can be a long bail with inwardly projecting ends received in the holes 5, can be used, and the entire container can be picked up and placed on whatever base is desired, such as the grate of a grill, the imperforate bottom of a kettle or the ground. The paper is then lighted through one of the bottom holes.

It has been found that the charcoal ignites quickly and uniformly, sufficiently so that it may be dumped, ready to use, in ten to fifteen minutes or less.

When the charcoal is to be dumped, the trigger is moved manually out of the crook and into the stem, and the housing is lifted. The foot swings clear of the bottom edge of the housing, the grate swings down around the hinge rod, and the charcoal is dumped through the bottom of the housing.

If it is desired to use the device as a brazier or stove, the charcoal is left in place, and either food is grilled over the coals, or a pan is placed on top. In the latter case, the flow of air out the vent holes 6 is sufficient to maintain combustion of the briquettes.

Figure 10:
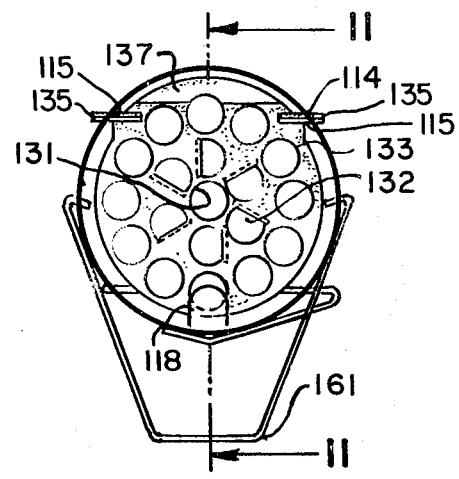
FIG. 10 is a top plan view of the device shown in FIG. 9.
Figure 11:
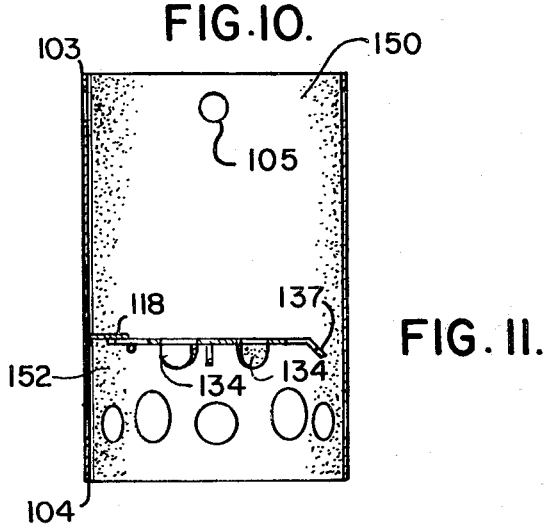
FIG. 11 is a sectional view taken along the line 11—11 of FIG. 10.
Figure 12:
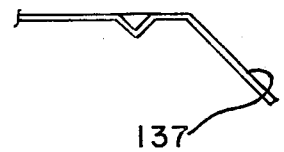
FIG. 12 is a fragmentary view in edge elevation of the grate of this embodiment.
Figure 13:
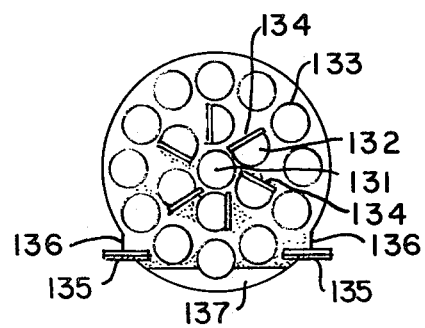
FIG. 13 is a bottom plan view of the grate.
Figure 14:
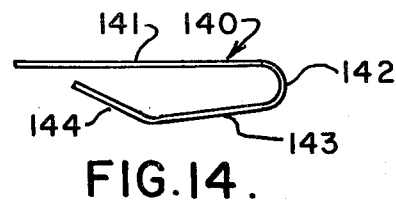
FIG. 14 is a plan view of the retainer shown in FIGS. 10 and 1.
Figure 15:
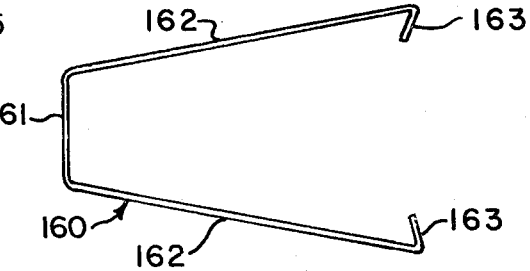
FIG. 15 is a plan view of the bail shown in FIGS. 9 and 10.

Referring now to FIGS. 9 through 15 for another embodiment of charcoal starter-burner of this invention, reference numeral 101 indicates the assembled device. The device 101 includes a tubular housing 102 with a hemmed upper edge 103 defining an open top, and a hemmed lower edge 104 defining an open bottom. In this embodiment, the housing 102 is cylindrical. Below the upper edge 103, the wall of the housing has four vent and bail-receiving openings 105 at four quadrants. Near the lower edge 104, there are twelve draft openings, equispaced around the circumference of the housing. In this embodiment there are six openings 111 and six openings 112, the latter being larger than the former, and alternating with them.

Axially a third of the distance between the bottom edge 104 and the top edge 103 is a stop tab 118, lanced from the wall of the housing and projecting radially inwardly into the housing. The lancing of the stop tab produces an opening 119 in the housing wall, defined at its upper end by the root of the tab, and extending axially downwardly a substantial distance. A short distance below the stop tab 118, aligned chordally, and positioned symmetrically with respect to the stop are retainer holes 114.

Hingepin holes 115 are aligned chordally and positioned at a height from the bottom edge between the retainer holes 114 and the tab 118, near the other end of the diameter perpendicular to the chord of the retainer holes.

It will be understood that the various openings in the housing wall are punched and lanced in a flat sheet which is bent into a cylinder in this embodiment, and secured at an overlapping margin by spot welds 120. It could of course be riveted or otherwise secured.

In this embodiment a grate, with a central opening 131 and rings of openings 132 and 133 arranged concentrically about the central opening, has aligned, oppositely directed hinge studs 135, integral with the grate, projecting chordally from the grate through the hinge holes 114. The hinge studs are made rigid by bending them into a V, the lower edge of the V serving as the bearing line. The hinge axis defines two areas of the grate, one of much greater extent than the other. Tabs 134 are lanced downwardly along one chord of the openings 132.

In this embodiment, the grate 130 is not circular. Through approximately 122°, the grate is on one radius, with the center of the central opening as the center. It is then provided with a chordal offset part 136 with parallel side edges from which the studs 135 project. Beyond and between the studs, through the area of lesser extent, the grate is on a larger radius. A lip 137 is bent down from the plane of the rest of the grate along a chord parallel to the axis of the hinge studs 135.

The grate is positioned immediately below the stop 118 and, when its upper surface is in contact with the lower surface of the stop 118, is immediately above the retainer holes 114. The grate is held in charcoal supporting position by a retainer 140 made of a springy metal rod or heavy wire. The retainer has a straight reach 141, one end of which is free and one end of which is bent to form a connecting part 142 in the form of a somewhat open U, connecting the straight reach to a handle reach 143, thence to a detent reach 144. The handle reach 143 angles away from the reach 141, the detent reach 144 angles, more sharply, toward the straight reach 141, as shown particularly in FIG. 14. The dimensions of the various reaches of the retainer 140 are such as to permit the straight reach 141 to extend from one retainer hole 114 through the other and the detent reach 144 resiliently to embrace an arc of the circle of the side wall, so that the retainer can be sprung into position and back out again, but its movement is inhibited by the engagement of the side wall of the housing by the detent reach 144.

A one piece bail 160 of this embodiment has a straight handle section 161, two legs 162 that diverge from one another in a direction away from the handle, and hooks 163 at the free ends of the legs, projecting in a direction toward one another and at an acute angle to the adjacent surface of the legs.

As in the first embodiment, the grate divides the burner into an upper charcoal chamber 150 and a lower ignition chamber 152, which, in this embodiment, are about ⅔ and ⅓ of the height, respectively.

Merely by way of illustration, the housing of this embodiment can be made 12″ tall and 7″ in inside diameter, with the centers of the hinge holes 115 4″ above the lower edge. The retainer holes 114 can have their centers at a distance of 3 13/16″, 3/16″ below the height of the lower surface of the stop tab 118. The lip 137 can have an angle of 45° from the plane of the rest of the grate and extend ⅞″ from its line of bending at its center. The diameter of the draft holes 111 can be 1″, that of the draft holes 112, 1¼″. The stop 118 can be 1⅜″ long and 1″ wide. The vent and bail-receiving openings 4 can be ¾″ in diameter. Taking the center of the central opening 131 as the point of generation, the radius of the lip portion of the grate, from and between the studs 135 can be 3¼″, the distance between the parallel sides of the chordal offset part 136, 5⅛″, and the radius of the circular section between the sides of the chordal part, 3″. This provides ½″ clearance between the grate and the inside wall of the housing through approximately 122°, and a little more than ¼″ clearance between the edge of the lip and the wall of the housing. The studs can project typically 7/16″ from the sides of the chordal part, and ¼″ wide after they are bent. The chordal line along which the lip is bent can be 2⅝″ from the diameter parallel to it through the center of the central opening 131. The bail handle part can be 3″ long, the legs 9½″ from the handle part to the roots of the hooks and 6½″ apart at that point, the hooks 1″ long, and bent up about 15° from a line parallel to the handle part. The straight reach of the retainer 140 can be 6 9/16″ long, the U shaped connecting part 9/16″ wide, the handle reach, 3¼″ long, tending from the straight reach 8°, and the detent reach can be 1½″ long, tending toward the straight reach at an angle of 25° to the straight reach, leaving a gap of about ¼″ between the straight reach and the free end of the detent reach.

It has been found that the provision of the lip 137, sloping downwardly from the plane of the rest of the grate in the direction away from the hinge axis largely eliminates the problem of jamming of charcoal in that area when the grate is swung down. The provision of the simple retainer, in conjunction with the stop 118, provides an economical and easily operated device which, because of its engaging the outside wall of the housing is nonetheless safe and efficient when the device is in use, and unlikely to be lost when the device is not in use. In the present embodiment, it also serves to ensure that the bail does not fall down to a position at which the handle part 161 gets too close to the housing, although in the embodiment described the dimensions of the handle part and legs of the bail and the angles of the legs are such as to cause the legs to engage the outside surface of the housing, to prevent extreme downward movement of the bail.

It can be seen that features of the two embodiments can be combined. Thus, for example, a grate with a lip as described in the second embodiment can be used in the first embodiment.

Numerous variations in the construction of the charcoal starter-burner of this invention, within the scope of the appended claims, will occur to those skilled in the art in the light of the foregoing disclosure. Illustrative variations are described in U.S. Pat. No. 4,321,907 of which this is a continuation-in-part.

I claim:

1. In a charcoal starter-burner having an elongated, open-ended, tubular housing, the improvement comprising a grate hinged to said housing on a hinge axis defining a side of said grate of greater extent and a side of lesser extent, said grate being substantially planar on a said side of greater extent and being bent down from the said plane to define a lip on the said side of lesser extent, said lip being at an angle of between 30° and 50° from the upper surface of the planar side of greater extent of said grate.

2. The starter-burner of claim 1 wherein said grate has a substantially circular section, a central opening, and, on a plurality of concentric circles, a plurality of openings, openings on a circle intermediate the central opening and the outermost circle having downwardly projecting tabs integral with said grate and defining at their root an edge of said openings.

3. The improvement of claim 1 wherein said housing has four identical vent and bail-receiving openings at quadrants near the upper edge of said housing, said openings having a total area on the order of 20% of the total area of draft holes at the lower edge of said housing.

4. The improvement of claim 3 including a bail selectively mountable in and demountable from pairs of bail and vent-receiving openings, said bail comprising a flat central handle span, a pair of staight legs integral with opposite ends of said handle span and extending in the same direction but divergently therefrom, and hooks integral with the ends of said legs and projecting toward one another at reentrant angles, said legs being sufficiently long and flexible to permit said hooks to be moved mechanically away from one another to clear said housing and to spring back into said openings, and said legs being so angled that when the hooks are mounted in said openings and the bail is allowed to fall, the said legs engage the sides of the housing and cause the flat handle span to remain clear of the housing far enough to admit a person's hand.

5. In a charcoal starter-burner having an elongated, open-ended, generally cylindrical tubular housing, the improvement comprising a perforate grate hinged on a hinge axis to said housing to define areas of greater and lesser extent, and a stop integral with said housing, projecting into said housing above the said grate at a side opposite said hinge axis to overlie a portion of the area of greater extent of said grate when the grate is swung up to charcoal-supporting position, and defining at its root an edge of a hole extending below said grate when said grate is in charcoal-supporting position, said housing being provided with two holes located chordally with respect to one another, symmetrically with respect to said stop and immediately below the said grate when the grate is in contact with the underside of the stop, and means for supporting said grate, removably mounted in said holes, said supporting means comprising a retainer with a straight reach extending between and through the said holes, a handle reach tending away from the straight reach, and a detent reach tending toward the straight reach at an angle greater than the tangent to the cylindrical housing and extending sufficiently close to said straight reach to engage the outside surface of said housing when said retainer is in place, said retainer being sufficiently flexible to allow said detent reach to be sprung away from said housing to permit selective withdrawal of said straight reach from the holes.

* * * * *